June 6, 1950            H. B. FUGE            2,510,467
REGULATING SYSTEM
Filed April 24, 1946
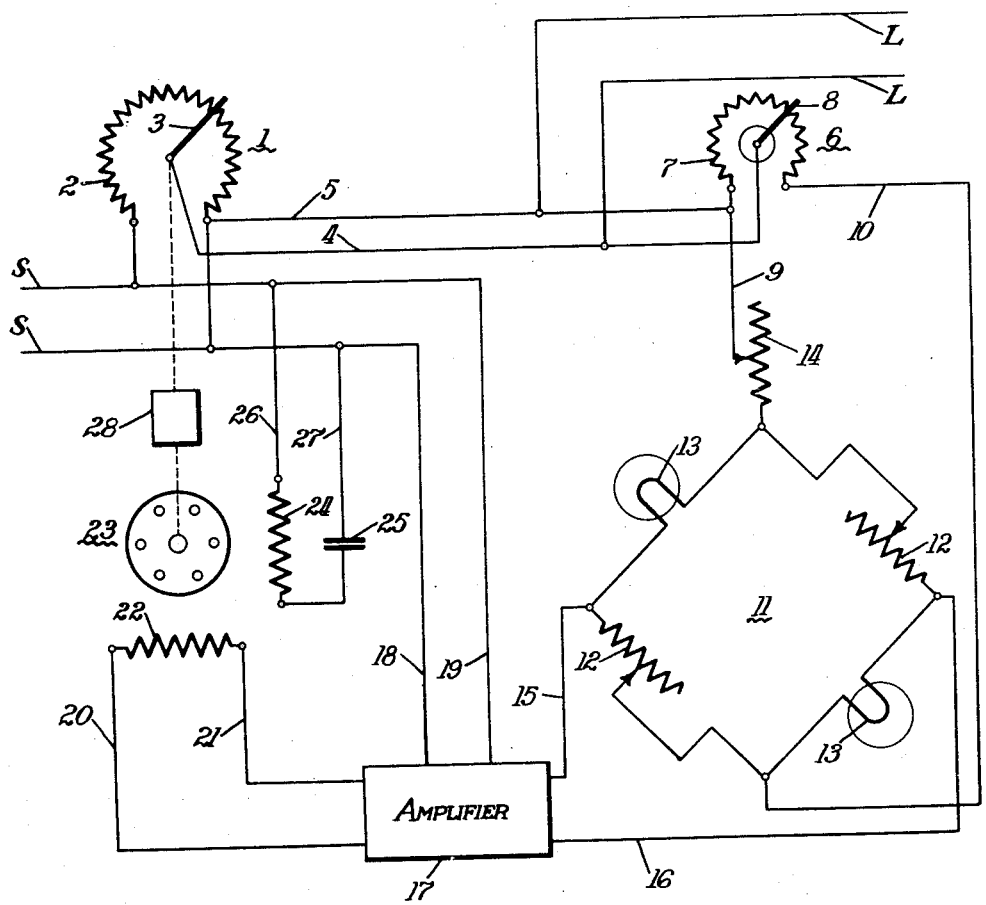
Inventor
Harry B. Fuge
By William P. Stewart
Attorney
Witness:
N. Leszczak Patented June 6, 1950

2,510,467

UNITED STATES PATENT OFFICE 2,510,467

REGULATING SYSTEM

Harry B. Fuge, Somerville, N. J., assignor to The Singer Manufacturing Company, Elizabeth, N. J., a corporation of New Jersey Application April 24, 1946, Serial No. 664,467

5 Claims. (Cl. 323—47)

This invention relates to a system for regulating the electrical condition of a circuit and, more particularly, for continuously controlling the voltage of an electrical circuit of which the load is subject to wide fluctuation in value.

It is a primary object of this invention to provide a voltage regulating system which shall be sensitive, have elements which are small in physical size compared with the load handled, and have no contact-making or contact-breaking elements.

A further object of this invention is to provide a voltage regulating system in which the value of the voltage to be maintained constant may be readily reset at any time, within wide limits, and without interruption of power to the load.

The invention will be better understood from the following description when considered in connection with the accompanying drawing and its scope will be pointed out in the appended claims.

Referring to the drawing, the single figure is a diagrammatic illustration of a voltage regulating system wherein the invention has been embodied.

The figure shows a variable auto-transformer 1 of the well-known Variac type comprising a winding 2 in running contact with which is a rotatable arm 3. The opposite ends of winding 2 are connected across input bus or circuit s—s, which is connected to a regular commercial source of alternating current energy (not shown). Connected to the rotatable arm 3 and to one end of said winding 2 are conductors 4 and 5, respectively, which constitute the output circuit of the variable transformer 1 and which are connected to the load bus L—L, which, in turn, is connected to and supplies a load (not shown).

A second but smaller variable auto-transformer 6, having winding 7 and rotatable contact arm 8, has its output circuit from the opposite ends of winding 7 connected to conductors 9 and 10. The input circuit to the transformer 6 is connected to conductors 4 and 5 at one end of the winding 7 and the contact arm 8, respectively.

A non-linear bridge 11 of the well-known Wheatstone type comprises opposite pairs of arms, one pair containing linear adjustable resistors 12 and the other pair containing resistors 13 of the lamp filament type having a high positive temperature coefficient of resistance. The output of the transformer 6 is connected by means of conductors 9 and 10, in series with an adjustable resistor 14, to diagonally opposite points of the bridge 11. The remaining two opposite points of the bridge 11 are connected by means of conductors 15 and 16 to the input of an amplifier 17. It has been found that an ordinary conventional three-stage amplifier employing a Class B output stage and utilizing 6A6 type tubes works satisfactorily here. The power supply for the amplifier is obtained from the input bus s—s by connection thereto by means of conductors 18 and 19. Connected to the output of amplifier 17 by means of conductors 20 and 21 is the control phase winding 22 of a split-phase induction motor 23. This motor is preferably of the low-inertia type described in my U. S. patent application Serial No. 563,380, filed November 14, 1944, now U. S. Patent No. 2,438,872, to which reference may be had for a better understanding of this type of motor. Motor 23 has a reference phase winding 24 connected in series with a phase-splitting capacitor 25 across the input bus s—s by means of conductors 26 and 27. The motor 23 is mechanically connected to drive the rotatable contact arm 3 through a gear reduction, indicated at 28, of approximately 600 to 1. The direction in which the motor runs is determined by the phase of the control phase voltage, as is well known in motors of this type.

The non-linear resistance bridge 11 is a voltage responsive device and may be adjusted by means of adjustable resistors 12 and 14 so that, at a predetermined input alternating-current voltage across conductors 9 and 10, the output voltage across conductors 15 and 16 is zero. At input voltages below and above this predetermined value, the output voltage increases and is of opposite phase. Thus, whenever the input voltage to the bridge departs from the predetermined value, a signal voltage is impressed upon the amplifier 17, which voltage, after amplification, is impressed upon the control phase winding 22 of the low-inertia motor 23. Further, this voltage on winding 22 will have a time phase relation with respect to the voltage applied to the reference phase winding 24 from the input bus s—s, which phase relation depends upon whether the input voltage to the bridge 11 is above or below the predetermined value. For this reason, the motor 23 will run and drive the transformer 1 through the gear reduction 28 in a direction to restore the input voltage to the bridge to its predetermined value. When this occurs, the signal voltage to the amplifier 17 returns to zero and the motor stops, thus bringing the system to rest.

One feature of the system according to this invention resides in the use of the second variable transformer 6. This may be a physically small unit compared with the main transformer 1 because it need only supply the small losses in the bridge circuit. By manual adjustment of the transformer 6, the voltage input to the bridge may be made different than that at the load bus s—s, depending upon the position of the contact arm 8. Since the input voltage to the bridge is maintained constant by the control operation as described above, it is clear that the voltage at the load bus L—L will also be held constant, but at a value different from that at the bridge input by an amount determined by the manual setting of the rotatable arm 8.

This adjustable feature is of considerable practical importance in readily permitting any desired change in the regulated voltage to be made at any time and without interruption of the load.

Due to amplification of the signal voltage by the amplifier 17 coupled with the low-inertia motor, the system is made very sensitive and will respond quickly and accurately to slight deviations in the voltage at the load bus from a predetermined value. Further, the components are small because the motor 23, upon which depends the size of the control equipment, need only be large enough to supply the rotational losses in the transformer 1. In fact, the only element directly influenced by the size of the electrical load to be handled is the transformer 1.

From the foregoing it will be seen that the entire regulation cycle is performed without the use of contact making and/or breaking elements in either the power or the control circuits, thus removing a servicing problem which ordinarily is severe in many prior regulating systems.

The arrangement of the circuit is such that the transformer 6, with a control knob connected to the rotatable arm 8, may conveniently be placed remotely from the rest of the equipment by making conductors 9 and 10 of the required length. The only special requirement is that the conductors 15 and 16 should be of low impedance to prevent loss of the small signal voltage in its transfer from the bridge to the amplifier.

While the gear reduction ratio shown at 28 is of the order of 600 to 1 in the embodiment shown, it is not intended that the invention be so limited, but includes within its scope any speed ratio found to give desirable results, which ratio will depend primarily upon the torque-speed characteristics of the specific motor employed.

The system also has the advantages that are inherent in continuous control as compared with on-off or step-by-step control and thus avoids any circuit disturbances due to suddenly applied or removed voltages.

From the foregoing it will be perceived that I have provided a voltage regulating system which is sensitive, small in size and continuous in operation without the use of circuit-breaking elements and with ready adjustability of the regulated voltage.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

Having thus set forth the nature of the invention, what I claim herein is:

1. A voltage regulating system comprising a source of alternating-current voltage, an output circuit connected to a load, means for providing an amplified alternating current voltage responsive to the departure from a predetermined voltage value of the output circuit, variable transformer means for controlling the voltage of said output circuit, and a motor for driving said transformer having two input windings, one winding being connected to said source and the other winding being connected to the amplified alternating current voltage provided by said voltage responsive means, whereby said departure of voltage causes said motor to run and drive said variable transformer in a direction to restore the voltage of the output circuit to said predetermined value.

2. A voltage regulating system comprising a source of alternating current voltage, an output circuit connected to a load, a variable transformer connected between said source and said output circuit for controlling the voltage of said output circuit, a motor for driving said variable transformer, a control circuit for supplying control energy to said motor including a voltage-responsive non-linear bridge, a voltage-adjusting transformer connected between said output circuit and said bridge for adjusting the voltage input to said bridge, and an amplifier connected between said bridge and said motor for amplifying the output bridge voltage before application thereof to said motor, whereby said motor runs and drives the variable transformer to maintain the voltage of the output circuit constant at a value predetermined by the setting of said voltage adjusting transformer.

3. A voltage regulating system comprising a source of alternating-current energy, an output circuit connected to a load, a variable transformer connected between said source and said output circuit, control means for varying the turn ratio of said transformer, said means including a driving motor having a reference winding directly connected to said source and a control winding, and means including a non-linear bridge and an amplifier for providing an amplified alternating current voltage for said control winding, said voltage having its phase determined by the direction of departure of the output circuit voltage from a predetermined adjustable value.

4. A voltage regulating system comprising a source of alternating current energy, an output circuit, a variable transformer connected between said source and said output circuit, control means for operating said variable transformer including a low-inertia motor mechanically coupled thereto, said motor having a reference winding connected to said source, and a control winding connected to a source of amplified alternating current control voltage including an amplifier and a non-linear bridge, said control voltage being derived from a departure from a predetermined value of the voltage of said output circuit, the phase of said control voltage being determined by the direction of said departure.

5. A voltage regulating system comprising a source of alternating-current energy, an output circuit connected to a load, a variable transformer connected between said source and said output circuit for regulating the voltage of said output circuit, a low-inertia motor coupled mechanically to said variable transformer and having a control winding, the direction of operation of said motor being determined by the phase of the voltage applied to said control winding, and means including a non-linear bridge and an amplifier for deriving an amplified alternating current control voltage upon departure of the output circuit voltage from a predetermined value, the phase of said control voltage being determined by the direction of said departure, and means for applying said control voltage directly to said control winding whereby said motor runs and drives said variable transformer in a direction to restore said output circuit voltage to its predetermined value.

HARRY B. FUGE.

REFERENCES CITED

The following references are of record in the file of this patent:

UNITED STATES PATENTS

| Number | Name | Date |
| --- | --- | --- |
| 854,121 | Storer | May 21, 1907 |
| 1,118,632 | Burnham | Nov. 24, 1914 |
| 1,468,729 | O'Hara | Sept. 25, 1923 |
| 1,654,948 | Thompson | Jan. 3, 1928 |
| 1,917,474 | Von Ohlsen | July 11, 1933 |
| 2,175,870 | Blume | Oct. 10, 1939 |
| 2,239,768 | Artzt | Apr. 29, 1941 |
| 2,310,335 | Wolfson | Feb. 9, 1943 |
| 2,399,266 | Stiefel | Apr. 30, 1946 |
| 2,412,263 | Hartig | Dec. 10, 1946 |